(12) United States Patent
Tu et al.

(10) Patent No.: US 8,766,555 B2
(45) Date of Patent: Jul. 1, 2014

(54) TUNABLE WHITE COLOR METHODS AND USES THEREOF

(75) Inventors: Qifei Tu, Shanghai (CN); Wa-Hing Leung, Hong Kong (CN)

(73) Assignee: Huizhou Light Engine Ltd, Huizhou (CN)

( * ) Notice: Subject to any disclaimer, the term of this patent is extended or adjusted under 35 U.S.C. 154(b) by 669 days.

(21) Appl. No.: 13/157,747

(22) Filed: Jun. 10, 2011

(65) Prior Publication Data

US 2012/0001555 A1    Jan. 5, 2012

Related U.S. Application Data

(60) Provisional application No. 61/360,669, filed on Jul. 1, 2010.

(51) Int. Cl.
| | | |
|---|---|---|
| *H05B 33/14* | (2006.01) | |
| *H05B 33/08* | (2006.01) | |
| *F21V 7/00* | (2006.01) | |
| *F21Y 113/00* | (2006.01) | |
| *F21Y 101/02* | (2006.01) | |

(52) U.S. Cl.
CPC ........ *H05B 33/0818* (2013.01); *H05B 33/0872* (2013.01); *F21Y 2113/005* (2013.01); *F21Y 2101/02* (2013.01); *F21V 7/0008* (2013.01); *Y02B 20/347* (2013.01); *H05B 33/0863* (2013.01)
USPC ............................ 315/294; 315/161; 315/307

(58) Field of Classification Search
USPC .................................. 315/161, 291, 294, 307
See application file for complete search history.

(56) References Cited

U.S. PATENT DOCUMENTS

| | | | | |
|---|---|---|---|---|
| 2009/0086475 | A1* | 4/2009 | Caruso et al. | 362/231 |
| 2012/0326627 | A1* | 12/2012 | McDaniel, Jr. | 315/294 |
| 2013/0141014 | A1* | 6/2013 | Rains et al. | 315/294 |

FOREIGN PATENT DOCUMENTS

| | | |
|---|---|---|
| CN | 1149683 C | 5/2004 |
| CN | 101384114 A | 3/2009 |

(Continued)

OTHER PUBLICATIONS

International Search Report issued for PCT/CN2011/075797, issued on Sep. 29, 2011.

(Continued)

*Primary Examiner* — Don Le
(74) *Attorney, Agent, or Firm* — Schiff Hardin LLP

(57) ABSTRACT

A lighting apparatus includes: first, second and third groups of solid state light emitters; a first group of lumiphors; at least first, second and third power lines, the first, second and third group of solid state light emitters each being electrically coupled to at least one of the first, second and third power lines. A current controller controls the relative flux ratios of the first, second and third groups, the controller being programmed to, in response to receipt of a command, retrieve a set of data from a look-up table that contains information of the required flux output of each group of LEDs and generate pulse width modulation (PWM) signals to control current supplied to each group to alter the flux output of each group in order to achieve a desired CCT and total flux output.

46 Claims, 8 Drawing Sheets

(56) References Cited

FOREIGN PATENT DOCUMENTS

| CN | 101554088 A | 10/2009 |
|---|---|---|
| CN | 101611259 A | 12/2009 |
| EP | 2211083 A1 | 7/2010 |
| JP | 2006-351319 A | 12/2006 |
| JP | 2009-238729 A | 10/2009 |
| JP | 2010-512621 A | 4/2010 |
| TW | 384422 | 3/2000 |
| TW | 384460 | 3/2000 |
| TW | 200912207 A | 3/2009 |
| WO | WO-2008/073794 A1 | 6/2008 |
| WO | WO-2010/041183 A2 | 4/2010 |

OTHER PUBLICATIONS

Written Opinion of the International Search Report for PCT/CN2011/075797, issued on Sep. 29, 2011.
Dec. 17, 2013 Office Action for Chinese Patent Application No. 201010624961.1 (with English translation).
Feb. 24, 2014 Office Action for Japanese Patent Application No. 2013-516978 (with English translation).
Aug. 15, 2013 Search Report for Taiwanese Patent Application No. 100121616.

* cited by examiner

TUNABLE WHITE COLOR METHODS AND USES THEREOF

CROSS-REFERENCE TO RELATED APPLICATION

This application claims benefit under 35 U.S.C. §119(e) to U.S. Provisional Patent Application Ser. No. 61/360,669, filed Jul. 1, 2010, which is hereby incorporated by reference herein.

Throughout this application, several references are referenced herein. Disclosure of these references in their entirety is hereby incorporated by reference in this application.

BACKGROUND OF THE INVENTION

The present invention relates to lighting devices and methods. In particular, devices and methods which use one or more light emitting devices and one or more luminescent materials.

In current illumination systems, white light typically covers the Correlated Color Temperature ("CCT") range of from 2700K to 6500K.

In order make CCT adjustments to current light sources, such as halogen or HID lamps, users are required to use color filters or gels to block unwanted color. In these cases, 20%-50% of light and electrical power is wasted.

Illuminating sources, e.g., lighting devices, may produce "white" light by adding two (or more) distinctly different combinations of colors. While the light emitted by any of these devices will appear white, if the devices are used to illuminate a colored object, which selectively absorbs certain colors, the object might look different when viewed with the two different "white" lights. For this reason, different "white" lights will reproduce colors of objects differently, depending upon the nature of the object.

Color reproduction is typically measured using Color Rendering Index ("CRI"). CRI is a relative measurement of how the color rendition of an illumination system compares to that of a blackbody radiator. The CRI equals 100 if the color coordinates of a set of test colors being illuminated by the illumination system are the same as the coordinates of the same test colors being irradiated by the blackbody radiator. Natural daylight has the highest CRI (of 100), and is considered the aspiring standard for color reproduction ability. In order to quantify color rendering performance, the International Lighting Committee (CIE) originally defined 8 test color samples (TSC) and evaluated the color difference of the TSCs when lit by black body radiator and the light source to be evaluated.

The color difference resulting for each TSC is termed as Ri (where i indicates the number of the TSC, initially set by the CIE from TSC1 to TSC8). CRI is an average value of R1 to R8 (the color difference values for TSC1 to TSC8, respectively) and is considered to be a general indicator of color rendering performance. Later, it was considered that 8 TSCs were not enough and 7 more TSCs (TSC9 to TSC15) were added.

Characteristics of a lighting device can be represented on a 1931 CIE (Commission International de l'Eclairage) Chromaticity Diagram. Those skilled in the art are familiar with this Diagram, which represents the mapping of human color perception as a function of two CIE parameters "x" and "y." These two parameters create chromaticity coordinates (x, y) which can be plotted in the Diagram. The spectral colors and their associated wavelengths are distributed along the edge of the outlined space, which includes all of the hues perceived by the human eye. The boundary line represents maximum saturation for the spectral colors.

Deviation from a point on the 1931 CIE Chromaticity Diagram can be expressed in either in terms of coordinates, or, in order to indicate as to the extent of the perceived differences in color, in terms of MacAdam ellipses. MacAdam ellipses are, by way of example, a locus of points defined as being ten MacAdam ellipses from a specific hue defined by a particular set of chromaticity coordinates consists of hues which would each be perceived as differing from the specified hue to a common extent (and likewise for loci of points defined as being spaced from a particular hue by other quantities of MacAdam ellipses).

The 1931 CIE Chromaticity Diagram also maps out a blackbody locus or "Planckian" locus, wherein the chromaticity coordinates that lie along the blackbody locus obey Planck's equation: $E(\lambda)=A^{-5}/(e^{(B/T)}-1)$, where E is the emission intensity, $\lambda$ is the emission wavelength, T the color temperature of the blackbody and A and B are constants. The human eye perceives white light when chromaticity coordinates lie near or on the Planckian locus. The Diagram was revised in 1976 such that the distance between points on the diagram is approximately proportional to the perceived color difference. Duv represents the distance to the closest point on the Planckian locus on the CIE 1960 (uv) diagram.

Correlated color temperature ("CCT") is the temperature of the blackbody whose perceived color most resembles that of the light source in question. Chromaticities falling on the black body or Planckian locus are identified by true color temperature while chromaticities near the locus are identified by CCT. In current illumination systems, white light typically covers CCT range of from 2700K to 6500K.

Semiconductor light emitting diodes (LEDs) produce light by exciting electrons across the band gap between a conduction band and a valence band of the semiconductor light-emitting layer. The wavelength of the light generated, when the LED is driven by current, depends upon the semiconductor materials of the light-emitting layers of the LED. Thus, the emission spectrum of any particular LED is concentrated around one wavelength. Because white light is a blend of light of more than one color, it is impossible to produce white light with a single light emitting diode. Prior art devices have achieved reproduction of white light by, for example, employing a pixel made of respective red, green and blue light emitting diodes. Other conventional devices have used a combination of light emitting diodes, e.g., emitting blue light, and a luminescent material that emits, e.g., yellow light, in response to excitation from the light from the LED.

As can be seen in FIG. 1, when white light is produced by combining two colors, the possible perceivable light that can be produced by such a combination graphs as a single line on the 1931 CIE Chromaticity Diagram. In FIG. 1, a hypothetical two color light source can produce light along the dotted line connecting the respective wavelength points of the two light sources along the outer outline edge of the Diagram. In the illustrated hypothetical case, white light could be produced by such a combination of light sources at the point at which the dotted line crosses the Planckian locus, at about 3000K.

On the other hand, when three color light sources are used, the range of possible colors that can be produced is shown on the Diagram as a triangle having vertices corresponding to the wavelengths of the three color sources. For example, FIG. 1 shows a dashed triangle that is typical of a standard RGB (red, green, and blue) device, such as for example in a CRT for a television or computer monitor. Such a device can produce any color within the area of the dashed triangle. As for white light, the RGB display could also produce white at 3000K, as in the two color light, but is not limited to this CCT value. For example, in the illustrated example, white colors ranging from 2700K to 6500K can be produced by the RGB solution. However, as discussed above, while the appearance of the mixed light itself will be similar regardless of the component colors making up the light, the appearance of an object illuminated by various lighting devices, whether two or three color devices, will differ depending upon the component colors of the light source.

While various combinations of phosphors (or "lumiphors") and light emitting devices have conventionally been utilized to create white light, it has been difficult using solid state light emitters to produce light that will complement natural skin tones, for example in lamps used for makeup mirrors and other similar uses.

U.S. Pat. No. 7,213,940 to Van de Ven et al. (the "'940 patent") attempts to address the problems relating to the production of pleasing white light by utilizing a device consisting of two types of LEDs and a lumiphor. In particular, Van de Ven proposed a lighting device that includes first and second groups of solid state light emitters, which, when illuminated, emit light having dominant wavelength in ranges of from 430 nm to 485 nm and from 600 nm to 630 nm, respectively, and a first group of lumiphors, which, when excited, emit light having dominant wavelength in the range of from 555 nm to 585 nm.

In the device defined in the '940 patent, the combination of light from the two LED sources and the lumiphor produces a mixture of light having coordinates on the 1931 CIE Chromaticity Diagram that define a polygon shaped area. This area from the '940 patent is shown as area 5 in FIG. 2.

FIG. 2 of the present application shows this area 5 plotted against a Planckian locus. As can be seen from FIG. 2, in the lighting device taught by the '940 patent, the combination of light sources produces a mixture of light having x and y coordinates that defines a point that is within ten MacAdam ellipses of at least one point on the Planckian locus. For example, area 5 as shown on FIG. 2 is defined by five lines, two of which are shown as dashed lines in FIG. 2. As can be seen from FIG. 2, with the two groups of light emitters used in the '940 patent, only white light with a CCT of between 2700K~4000K can be produced.

There exists a need to provide a lighting device that achieves improved CRI values using solid state light emitters, e.g., LEDs, in order expand their usage in fields such as film, theater, cosmetics, fashion and apparel. There is also a need for a highly efficient white light source using solid state light emitters with improved CRI values and a flexible, wide gamut, i.e., range of accessible colors.

BRIEF SUMMARY OF THE INVENTION

In consideration of the above problems, in accordance with one aspect of the present invention, a method of achieving a tunable white light from a solid state light emitting lighting apparatus, the method comprising: illuminating a first group of one or more solid state light emitters which emit light having a dominant wavelength in the range of from 430 nm to 485 nm; exciting a first group of one or more lumiphors which emit light having a dominant wavelength in the range of from 555 nm to 585 nm; illuminating a second group of one or more solid state light emitters which emit light having a dominant wavelength in the range of from 430 nm to 485 nm; and illuminating a third group of one or more solid state light emitters which emit light having a dominant wavelength in the range of from 600 nm to 635 nm such that:
 a combination of light exiting the solid state emitting lighting apparatus which was emitted by (1) the first group of solid state light emitters, (2) the first group of lumiphors, (3) the second group of solid state light emitters, and (4) the third group of solid state light emitters produces a mixture of light having x, y coordinates on a 1931 CIE Chromaticity Diagram which defines a point which is within three (3) or less MacAdam ellipses of at least one point on the Planckian locus on a 1931 CIE Chromaticity Diagram.

In a second aspect of the present invention, a method of achieving a tunable white light from a solid state light emitting lighting apparatus, the method comprising: illuminating a first group of solid state light emitters, the first group includes at least one solid state light emitter, such that each solid state light emitter in the first group emits light having a dominant wavelength in the range of from 430 nm to 485 nm; exciting a first group of one or more lumiphors which emit light having a dominant wavelength in the range of from 555 nm to 585 nm; illuminating a second group of solid state light emitters, the second group includes at least one solid state light emitter, such that each solid state light emitter in the second group emits light having a dominant wavelength in the range of from 430 nm to 485 nm; and illuminating a third group of solid state light emitters, the third group includes at least one solid state light emitter, such that each solid state light emitter in the third group emits light having a dominant wavelength in the range of from 600 nm to 635 nm such that:
 a combination of light exiting the solid state emitting lighting apparatus which was emitted by (1) the first group of solid state light emitters, (2) the first group of lumiphors, (3) the second group of solid state light emitters, and (4) the third group of solid state light emitters produces a mixture of light having x, y coordinates on a 1931 CIE Chromaticity Diagram which defines a point which is within three (3) or less MacAdam ellipses of at least one point on the Planckian locus on a 1931 CIE Chromaticity Diagram.

In another aspect of the present invention, if all of the first group of solid state light emitters are illuminated, at least one of the lumiphors in the first group of lumiphors is excited by light emitted by the first group of solid state light emitters.

In another aspect, resultant white light produced by the combination of the light emitters of the first and the respective first group of lumiphors is above the Planckian locus in the 1931 CIE chromaticity Diagram, and more than 7 MacAdam ellipses away from any point on the Planckian locus, and has a CCT between 3200K and 6000K, with a duv of >0.006.

In another aspect of the present invention, if all of the first group of solid state light emitters are illuminated, all of the lumiphors in the first group of lumiphors is excited by light emitted by the first group of solid state light emitters.

In another aspect of the present invention, the tunable white light from the solid state light emitting lighting apparatus has a CCT range of from 2700 k to 4500 k, from 2700 k to 6500 k, or between 2700 k to 6500 k.

In another aspect of the present invention, the tunable white light from the solid state light emitting lighting apparatus has a CRI of more than 85.

In another aspect of the present invention, the tunable white light from the solid state light emitting lighting apparatus has a CRI of more than 90.

In another aspect of the present invention, the tunable white light from the solid state light emitting lighting apparatus has a CCT range of from 2700K to 6500K and a CRI of more than 85.

In another aspect of the present invention, the tunable white light from the solid state light emitting lighting apparatus has a CCT range of from 2700K to 5500K and a CRI of more than 90.

In another aspect of the present invention, a combination of (1) light exiting the solid state light emitting lighting apparatus which was emitted by the first group of solid state light emitters, and (2) light exiting the solid state light emitting lighting apparatus which was emitted by the first group of lumiphors would, in the absence of additional light, produce a sub-mixture of white light which is above the Planckian locus in a 1931 CIE Chromaticity Diagram and more than seven (7) MacAdam ellipses from any point on the Planckian locus.

In another aspect, each solid state light emitter in the third group emits light that has a dominant wavelength in the range of from 615 nm to 620 nm.

In another aspect, each solid state light emitter in the second group emits light that has a dominant wavelength in the range of from 460 nm to 475 nm.

In another aspect, the relative flux ratios of the first, second and third groups are controlled by a current controller such that the first group of LEDs accounts for no less than 75% of the total lumen output, the second group accounts for no more than 10% of the total lumen output, and the third group accounts for no more than 25% of the total lumen output.

In another aspect, the CCT of the solid state light emitting lighting apparatus is adjusted by varying the driving currents of the LEDs, while maintaining a constant lumen output for any given CCT.

In another aspect, the CCT of the solid state light emitting lighting apparatus is adjusted by varying the total lumen output of the apparatus for different CCT options.

In a third aspect of the present invention, a lighting apparatus comprises a first group of one or more solid state light emitters which emit light having a dominant wavelength in the range of from 430 nm to 485 nm; a first group of one or more lumiphors which emit light having a dominant wavelength in the range of from 555 nm to 585 nm; a second group of one or more solid state light emitters which emit light having a dominant wavelength in the range of from 430 nm to 485 nm; and a third group of one or more solid state light emitters which emit light having a dominant wavelength in the range of from 600 nm to 635 nm; and at least first, second and third power lines, the first group of solid state light emitters, the second group of solid state light emitters, and the third group of solid state light emitters are each electrically coupled to at least one of the first, second and third power lines, wherein when current is supplied to at least one of the first, second and third power lines, a combination of light exiting the lighting apparatus which was emitted by (1) the first group of solid state light emitters, (2) the first group of lumiphors, (3) the second group of solid state light emitters, and (4) the third group of solid state light emitters produces a mixture of light having x,y coordinates on a 1931 CIE Chromaticity Diagram which defines a point which is within three (3) or less MacAdam ellipses of at least one point on the Planckian locus on a 1931 CIE Chromaticity Diagram.

In a fourth aspect of the present invention, a lighting apparatus comprises a first group of solid state light emitters; a first group of lumiphors; a second group of solid state light emitters; a third group of solid state light emitters; and at least first, second and third power lines, the first group of solid state light emitters, the second group of solid state light emitters, and the third group of solid state light emitters are each electrically coupled to at least one of the first, second and third power lines, wherein the first group of solid state light emitters includes at least one solid state light emitter, such that each solid state light emitter in the first group, if illuminated, emits light having a dominant wavelength in the range of from 430 nm to 485 nm; the first group of lumiphors includes at least one lumiphor, such that each lumiphor in the first group, when excited, emits light having a dominant wavelength in the range of from 555 nm to 585 nm; the second group of solid state light emitters includes at least one solid state light emitter, such that each solid state light emitter in the second group, if illuminated, emits light having a dominant wavelength in the range of from 430 nm to 485 nm; and the third group of solid state light emitters includes at least one solid state light emitter, such that each solid state light emitter in the third group, if illuminated, emits light having a dominant wavelength in the range of from 600 nm to 635 nm; if current is supplied to the first power line, a combination of light exiting the solid state emitting lighting apparatus which was emitted by (1) the first group of solid state light emitters, (2) the first group of lumiphors, (3) the second group of solid state light emitters, and (4) the third group of solid state light emitters produces a mixture of light having x,y coordinates on a 1931 CIE Chromaticity Diagram which defines a point which is within three (3) or less MacAdam ellipses of at least one point on the Planckian locus on a 1931 CIE Chromaticity Diagram.

In another aspect, if current is supplied to a power line, a combination of (1) light exiting the lighting apparatus which was emitted by the first group of solid state light emitters, (2) light exiting the lighting apparatus which was emitted by the first group of lumiphors, (3) light exiting the lighting apparatus which was emitted by the second group of solid state light emitters, and (4) light exiting the lighting apparatus which was emitted by the third group of solid state light emitters would, in an absence of any additional light, produce light having x, y color coordinates within an area on a 1931 CIE Chromaticity Diagram defined by points having coordinates (x=0.3863, y=0.4713); (x=0.1319, y=0.0747); (x=0.6867, y=0.3132).

In another aspect, the first group of solid state light emitters comprise a plurality of LEDs, the second group of solid state light emitters comprise a plurality of LEDs, and the third group of solid state light emitters comprise a plurality of LEDs.

In another aspect, the lighting apparatus is tunable as to CCT level by adjusting the current levels applied to one or more of the first, second and third groups of solid state light emitters.

In another aspect, the lighting apparatus is tunable to achieve a Ra>90, at CCT=2700K, 4500K and 6500K, and R13 and R15>90 on color samples corresponding to the color of human skin.

In another aspect, the lighting apparatus is tunable to achieve a Ra>90, at CCT in a range of 2700K~6500K, and R13 and R15>90 on color samples corresponding to the color of human skin.

In another aspect, the lighting apparatus further comprises: first, second and third current sources, corresponding to the first, second and third groups of solid state light emitters, respectively, and a controller that controls the current applied to the first, second and third groups of solid state light emitters, the controller being adapted to control the first, second and third current sources such that the lighting apparatus can achieve a Ra>90, at CCT=2700K, 4500K and 6500K, and R13 and R15>90 on color samples corresponding to the color of human skin.

In another aspect, the lighting apparatus further comprises: first, second and third current sources, corresponding to the first, second and third groups of solid state light emitters, respectively, and a controller that controls the current applied to the first, second and third groups of solid state light emitters, the controller being adapted to control the first, second and third current sources such that the lighting apparatus can achieve a Ra>90, at CCT in a range of 2700K~6500K, on color samples corresponding to the color of human skin.

In another aspect, the lighting apparatus further comprises a current controller that controls the relative flux ratios of the first, second and third groups, the controller having a look-up table associated therewith, the controller being programmed to: accept commands from a user, including a command to set a CCT and a total flux output in response to receipt of the command, retrieve a set of data that contains information of the required flux output of each group of LEDs from the look-up table, and based on the 100% duty cycle (full power) flux output of each group, generate pulse width modulation (PWM) signals to control current supplied to each group to alter the flux output of each group in order to achieve a desired CCT and total flux output.

In another aspect, the apparatus further comprises first, second and third current sources, corresponding to the first, second and third groups, respectively, the controller controlling the current supplied to each group via the first, second and third current sources.

In another aspect, the first, second and third current sources each have a temperature sensor to sense the temperature of groups, respectively, wherein currents supplied by the current sources are adjusted by the temperature sensors to compensate the flux variation due to temperature changes, allowing the 100% duty cycle flux output of each group of LEDs to be maintained irrespective of temperature changes.

In a fifth aspect of the present invention, a lighting apparatus comprises: a first group of solid state light emitters; a first group of lumiphors; a second group of solid state light emitters; a third group of solid state light emitters; at least first, second and third power lines, the first group of solid state light emitters, the second group of solid state light emitters, and the third group of solid state light emitters each being electrically coupled to at least one of the first, second and third power lines; and a current controller that controls the relative flux ratios of the first, second and third groups, the controller having a look-up table associated therewith, the controller being programmed to: accept commands from a user, including a command to set a CCT and a total flux output in response to receipt of the command, retrieve a set of data that contains information of the required flux output of each group of LEDs from the look-up table, and based on the 100% duty cycle, (full power) flux output of each group, generate pulse width modulation (PWM) signals to control current supplied to each group to alter the flux output of each group in order to achieve a desired CCT and total flux output.

In another aspect, the lighting apparatus further comprises first, second and third current sources, corresponding to the first, second and third groups, respectively, the controller controlling the current supplied to each group via the first, second and third current sources.

In a sixth aspect of the present invention, a method is provided on a solid state lighting apparatus comprising: a first group of solid state light emitters; a first group of lumiphors; a second group of solid state light emitters; a third group of solid state light emitters; at least first, second and third power lines, the first group of solid state light emitters, the second group of solid state light emitters, and the third group of solid state light emitters each being electrically coupled to at least one of the first, second and third power lines; and a current controller that controls the relative flux ratios of the first, second and third groups, the controller having a look-up table associated therewith. The method comprises the controller: accepting commands from a user, including a command to set a CCT and a total flux output in response to receipt of the command, retrieving a set of data that contains information of the required flux output of each group of LEDs from the look-up table, and based on the 100% duty cycle (full power) flux output of each group, generating pulse width modulation (PWM) signals to control current supplied to each group to alter the flux output of each group in order to achieve a desired CCT and total flux output.

In a seventh aspect of the present invention a lighting apparatus comprises: first, second and third groups of solid state light emitters; a first group of lumiphors; at least first, second and third power lines, the first, second and third group of solid state light emitters each being electrically coupled to at least one of the first, second and third power lines. A current controller controls the relative flux ratios of the first, second and third groups, the controller being programmed to, in response to receipt of a command, retrieve a set of data from a look-up table that contains information of the required flux output of each group of LEDs and generate pulse width modulation (PWM) signals to control current supplied to each group to alter the flux output of each group in order to achieve a desired CCT and total flux output.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which:

FIG. 10 also shows that, in an aspect of the present invention, high Ri values can be obtained in connection with skin color samples TSC13 and TSC15.

DETAILED DESCRIPTION OF THE INVENTION

In accordance with preferred embodiments of the present invention, a lighting device is provided that: (a) allows for a CCT tunable white color, preferably in the range of 2700K~6500K, or any range within, using three solid state light emitters, the white color being less than 3 MacAdam ellipses from a point on the Planckian locus, (b) provides a highly efficient usage of the LED sources, and (c) has a high CRI, especially for illuminating human skin.

The solid state light emitters can be light emitting diodes ("LEDs"). The LEDs can be, but are not limited to, individually-packaged LEDs, chip-on-board ("COB") LEDs, leaded LEDs, surface mount LEDs, SMD-On-Board LEDs, or LED dies individually die-bonded to a conductive bus. The PCB for COB LEDs and SMD-On-Board LEDs may be, for example, FR4 PCB, flexible PCB, or metal-core PCB. The LEDs may also be top-emitting LEDs, side-emitting LEDs, or a combination thereof.

FIGS. 3-6 show illustrative examples of lighting devices that can utilize the lighting configuration in accordance with the present invention.

Figure 1:
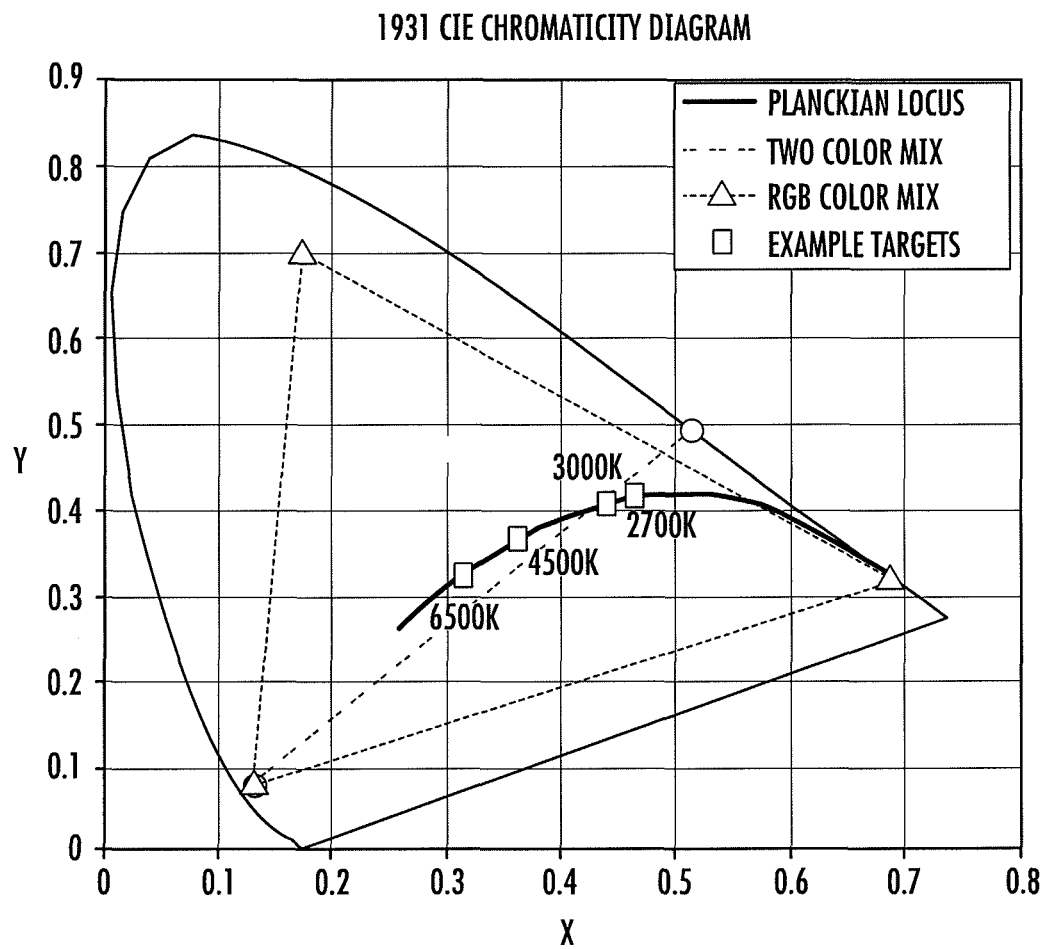
FIG. 1 shows a 1931 CIE Chromaticity Diagram, including the Planckian locus and shows the colors that can be matched by an RGB lighting device, and by a two color lighting device.
Figure 2:
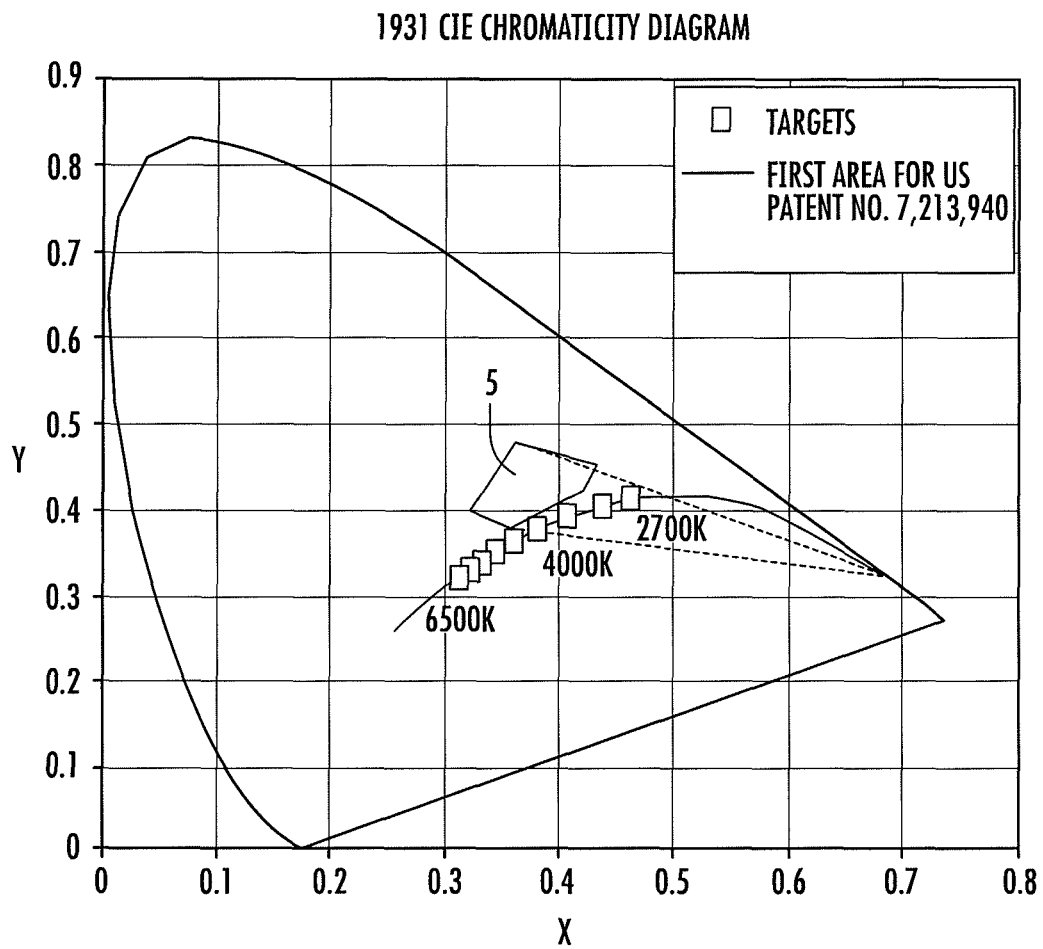
FIG. 2 shows a 1931 CIE Chromaticity Diagram showing an area associated with the device of the '940 patent.
Figure 3:
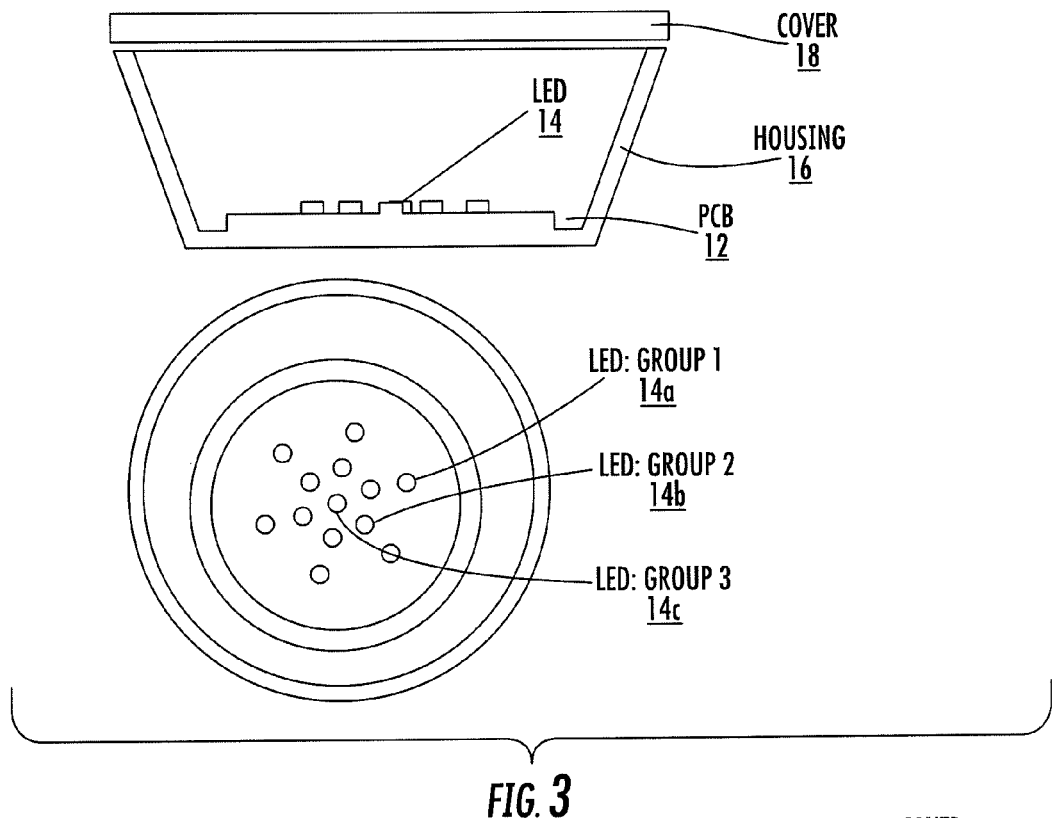
FIGS. 3-6 are views of lighting fixtures that can employ the lighting method and device according to an embodiment of the present invention.

A lamp fixture 10 shown in FIG. 3 includes a printed circuit board (PCB) 12, a plurality of LEDs 14, a housing 16 and a cover 18. As can be seen in the plan view of FIG. 3, in accordance with an aspect of the present invention, the LEDs 14 include a first LED group 14a, a second LED group 14b, and third LED group 14c. The layout of the groups of LEDs are not limited to the layout shown in the figures and can be arranged in any desired pattern. As would be understood by one of ordinary skill in the art, the lamp fixture could also include secondary optics, cooling devices, such as fans, light sensors, and the like.

In accordance with a preferred embodiment, preferably each element from the first group of LEDs includes a blue LED having, when illuminated, a dominant wavelength=430~485 nm plus a phosphor (lumiphor) having, when excited by the blue LED, a dominant wavelength=555~585 nm. A resultant light produced by the combination of the blue LEDs and the respective associated phosphors of the first group is above the Planckian locus in the 1931 CIE chromaticity Diagram, and more than 7 MacAdam ellipses away from any point on the Planckian locus. The mixed color of the LED and the phosphor preferably has a CCT between 3200K and 6000K, with a duv of >0.006. Duv is the distance to the closest point on the Planckian locus on the CIE 1960 (uv) diagram.

The third group of LEDs preferably includes red LEDs having, when illuminated, a dominant wavelength=600~635 nm, and most preferably =615 nm~620 nm. The second group of LEDs preferably includes Blue LEDs with, when illuminated, a dominant wavelength=430~485 nm, and most preferably =460 nm~475 nm. The term "dominant wavelength," is used herein according to its well-known and accepted meaning to refer to the perceived color of a spectrum, i.e., the single wavelength of light which produces a color sensation most similar to the color sensation perceived from viewing light emitted by the light source.

Figure 4:
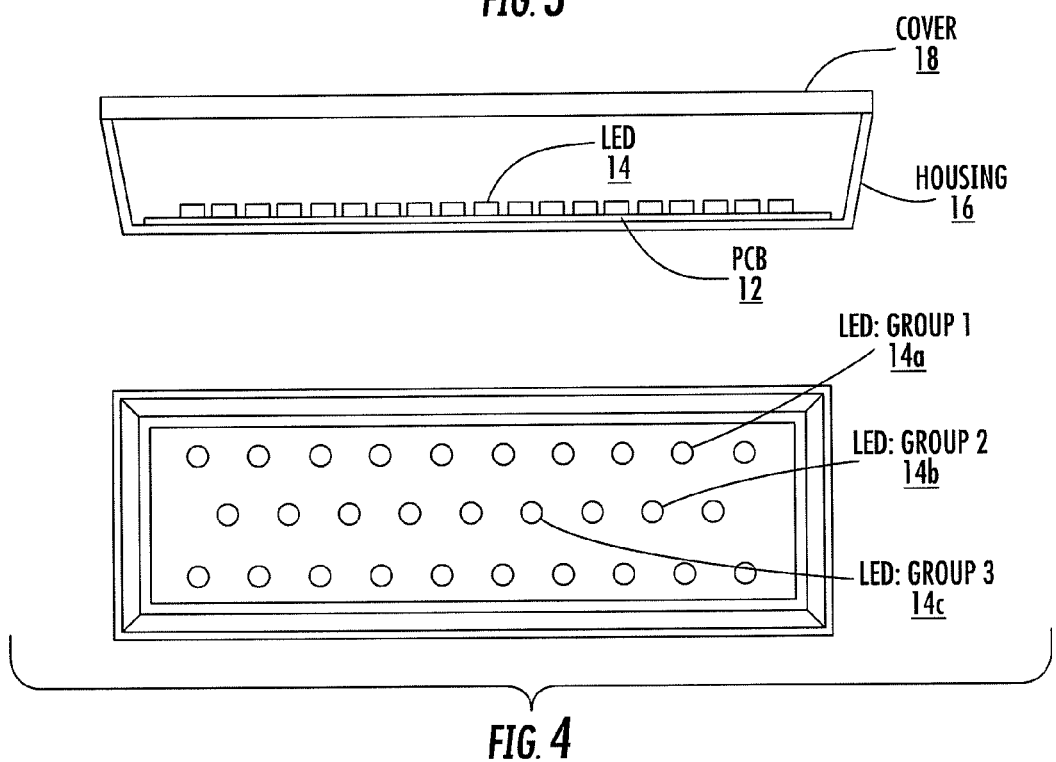
Figure 5:
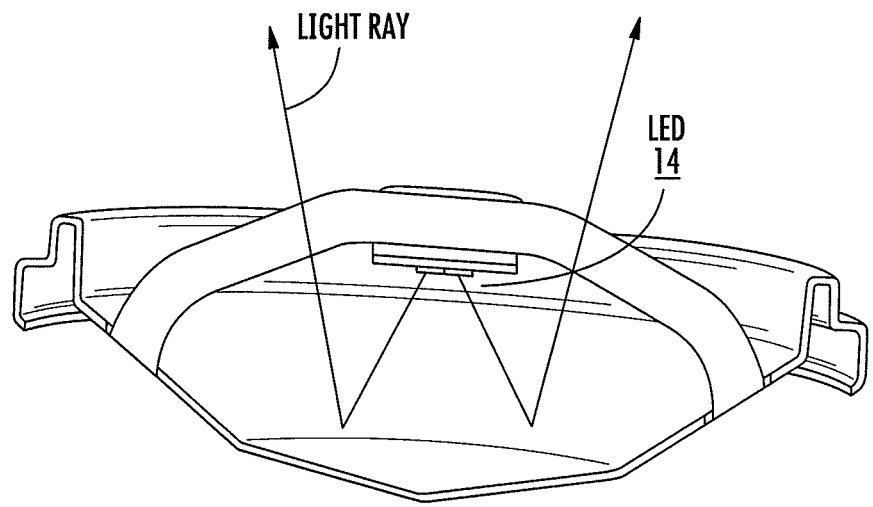
Figure 6:
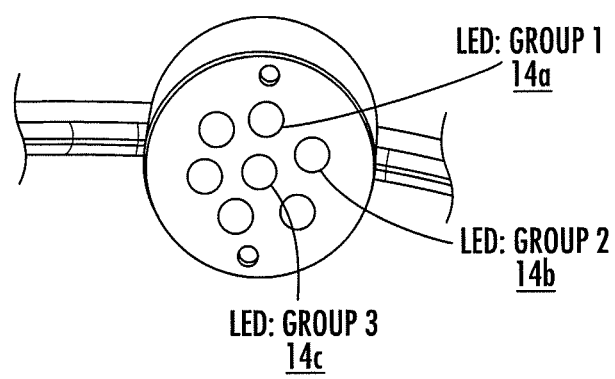

FIGS. 4-6 show essentially the same light emitting components, including LEDs 14a-14c, in a down light configuration, a light battern, and a spot lamp, respectively.

Figure 7:
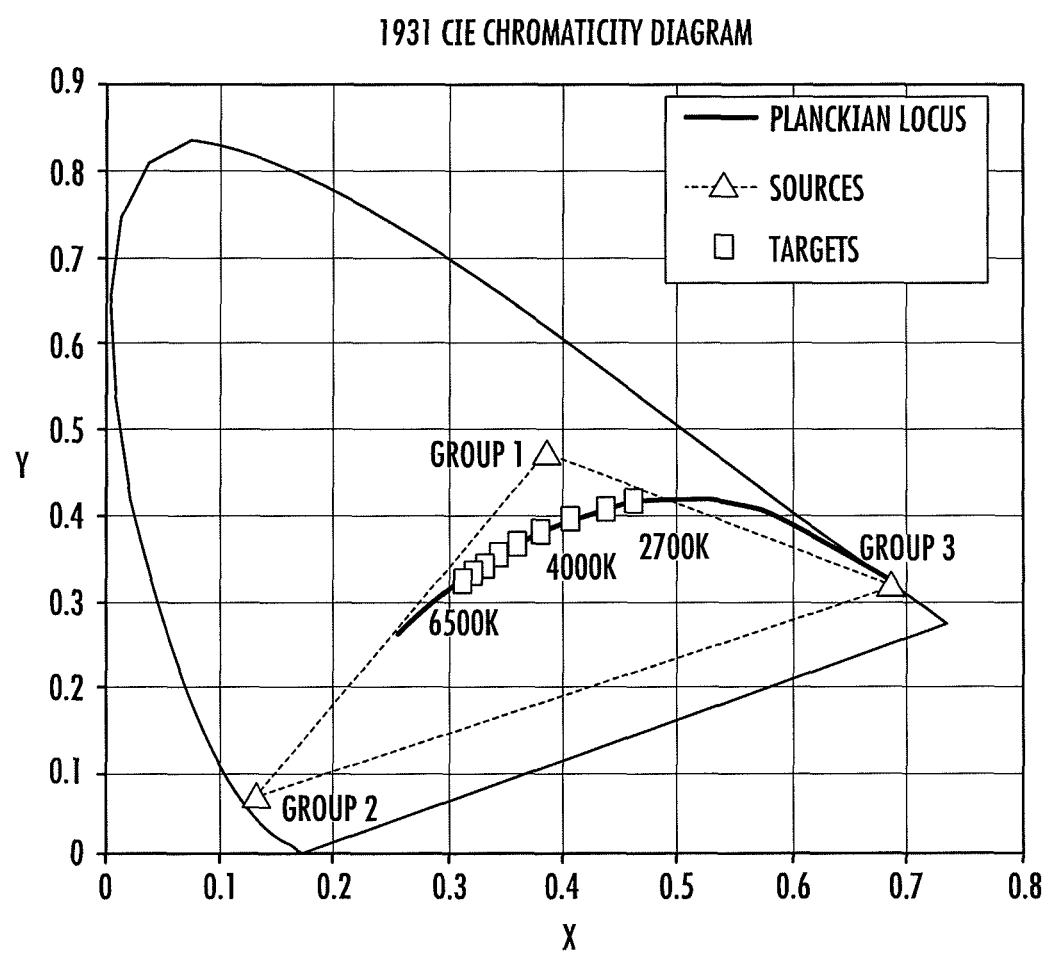
FIG. 7 is a 1931 CIE Chromaticity Diagram, including the Planckian locus and shows the colors that can be matched by a lighting device in accordance with an embodiment of the present invention.

FIG. 7 shows a triangle formed on the 1931 CIE Chromaticity Diagram that represents the colors producible by a device having the three groups of LEDs in accordance with a preferred embodiment. As can be seen in the figure, in a preferred example, the x, y coordinates for the three vertices of the triangle can be represented, for this example, by about: x=0.3863, y=0.4713; x=0.1319, y=0.0747; x=0.6867, y=0.3132.

When light sources are provided in accordance with the above embodiment, having the range of dominant wavelengths discussed, by adjusting the percent of light output (lumens) emitted from each group, different CCT can be achieved, together with a CRI>85, a duv (direction across the Planckian locus) of <0.001, and a resulting light less than 3 MacAdam ellipses away from any point on the Planckian locus.

Figure 8:
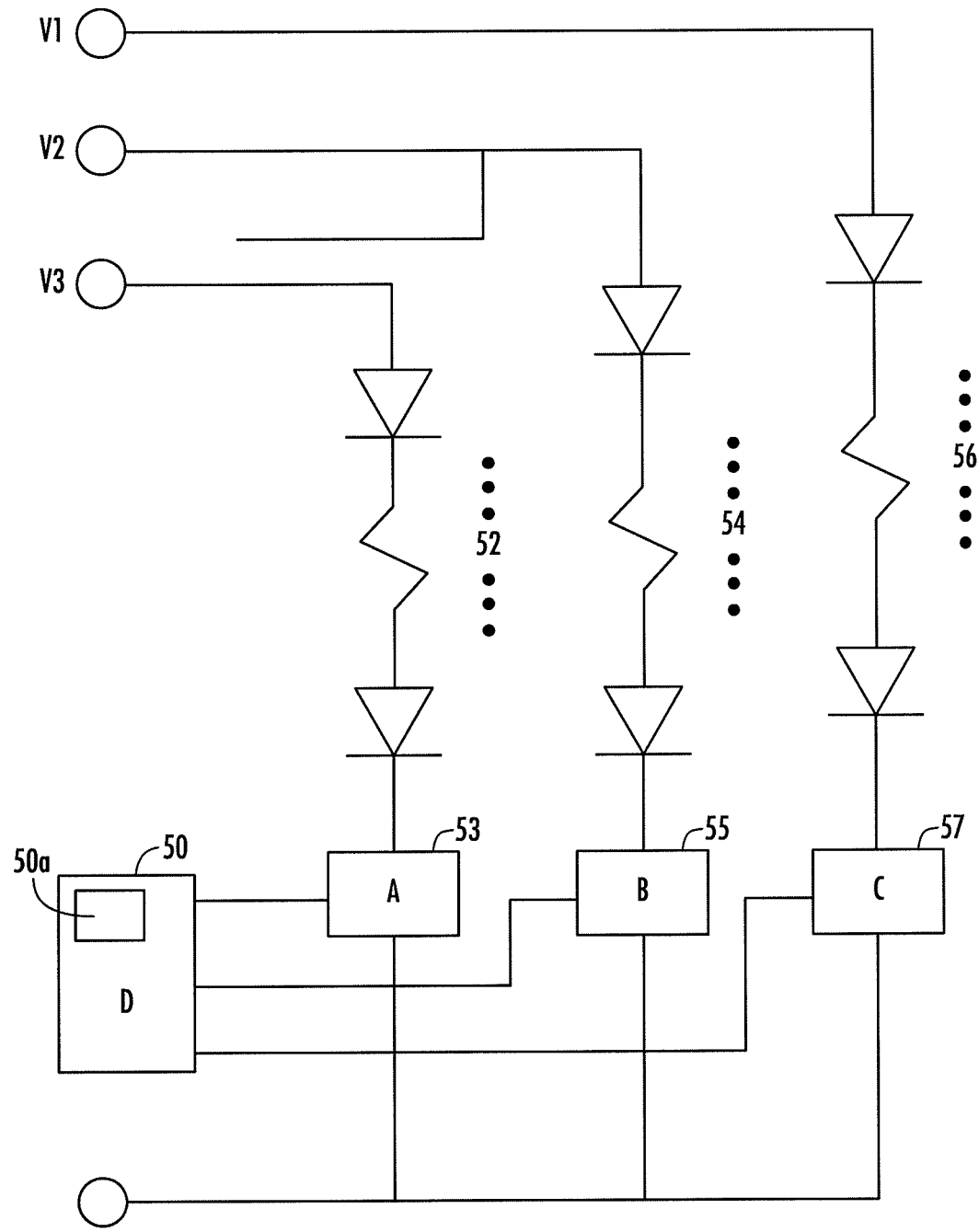
FIG. 8 is a diagram of an exemplary circuit that can be used to control the current supplied to the three groups of LEDs in accordance with an embodiment of the present invention.

FIG. 8 shows an exemplary driving circuit for power lines suitable for driving the three groups of LEDs 52, 54 and 56 in accordance with the preferred embodiments of the present invention. In a preferred embodiment the three groups of LEDs are driven separately, with adjustable constant current sources 53, 55 and 57, respectively. Element 50 comprises an electronic device for adjusting the current provided by the constant current sources. For example, element 50 can be configured to adjust the current supplied by the current sources to one or more of the respective groups of LEDs to maintain a mixture of light within 3 MacAdam ellipses of at least one point on the Planckian locus on the 1931 CIE Chromaticity Diagram. In some embodiments, the current provided to the groups of LEDs is automatically adjusted so as to alter, e.g., the CCT, of the combined emitted light.

As would be appreciated by one of skill in the art, such a device 50 could be microprocessor programmed to control the current sources to drive the LEDs in accordance with the present invention, allowing control over the relative flux of the LEDs, once the specifications for the particular LEDs being used is known. Alternatively, an analog control circuit that performs this current adjustment function can be employed. Persons of ordinary skill in the art are familiar with a wide variety of ways to supply and control the current passed through solid state light emitting devices, and any such ways can be employed in the devices in accordance with the present invention.

In a preferred embodiment, the three groups of LEDs are mixed to achieve a white color within the CCT range of 2700K~6500K. However, by adjusting the relative flux percentage of the three groups of light sources, e.g., LEDs, different CCT could be obtained. For full CCT range tuning, i.e., 2700k to 6500K, the relative flux ratios should preferably be such that the first group of LEDs should be no less than 75% of the total lumen output, the second group should account for no more than 10%, and the third group should account for no more than 25%.

Two tuning modes are preferable. In a first preferred tuning mode, the CCT is tunable, i.e., adjustable, by varying the driving currents of the LEDs, while maintaining a constant lumen output (flux) for any given CCT. In a second preferred tuning mode, the total lumen output of the device is adjusted for different CCT options. For example, a lower lumen output might be used for lower CCT to imitate natural lighting that occurs with a lower lighting level and lower CCT at dusk.

During CCT tuning, not all of the three groups of LEDs should be powered and the percentage of each group for different CCT values are calculated based on the source spectrum. As shown in Table 1, when the three groups of LEDs are selected with specific dominant wavelengths, i.e., within the wavelength range described above, the relative percentage of the flux for each group is determined. When the dominant wavelength of one group changes more than a tolerance, e.g., 5~10 nm, the percentage with be different. Thus, the relative flux of each group is calculated based on the spectrum of each group.

Table 1 shows a percentage of the lumen output for each group of LEDs, and the resulting white color performance level in accordance with an aspect of the present invention. For example, for a target CCT of 2700K, the percent of the lumen output attributed to the first group of LEDs is 77.8%, the percent attributed to the second group of LEDs is 0.7% and the percent attributed to the third group is 21.4%. This results in a CCT of 2691 with a duv of 0.0002.

TABLE 1

| Target CCT | Percentage of the lumen from each group | | | mixed results | |
|---|---|---|---|---|---|
| | Group One | Group Two | Group Three | CCT | duv |
| 2700K | 77.80% | 0.70% | 21.40% | 2691 | 0.0002 |
| 3000K | 80.50% | 1.40% | 18.10% | 2997 | 0.00006 |
| 3500K | 83.40% | 2.50% | 14.10% | 3493 | 0.0002 |
| 4000K | 85.10% | 3.60% | 11.30% | 3993 | 0.0003 |
| 4500K | 86.00% | 4.70% | 9.30% | 4508 | 0.00007 |
| 5000K | 86.50% | 5.70% | 7.80% | 5025 | 0.00007 |
| 5500K | 86.60% | 7% | 6.80% | 5519 | −0.0002 |
| 6000K | 86.70% | 7% | 6.00% | 6009 | −0.0002 |
| 6500K | 86.60% | 8.10% | 5.30% | 6502 | −0.00006 |

Table 1 gives the relative flux needed for each CCT ranged from 2700K~6500K. As typical for LEDs, the lumen output will increase with increasing current and LED suppliers would, e.g., provide this curve for current Vs flux, allowing the current needed for each group of LED for each CCT to be determined as long as the LEDs type is fixed. For the first tuning method, as lumen output would be fixed, the current for Group one and two will decrease while Group three increases with decreasing CCT target. The current change rate may be different for different groups and different types of LEDs. And for second tuning method, the relative flux percentage of each group will change in the same trend as the first tuning method. However in order to dim the light for lower CCT, the absolute lumen output of groups 1 and 2 may not be increased for lower CCT, this will depend on the current vs. flux performance of LED and also the dimming ratio of the application. The LED supplier would preferably provide the curve for Current vs. Flux, so the current for each group could be determined accordingly for each CCT. No other variable is changed. The resultant light is favorable for TCS13 and TCS15 which the inventors have found is representative for Caucasian and Asian skin tones, respectively.

In a preferred embodiment using a programmable controller 50, the controller is programmed to accept commands from a user, e.g. a command to set CCT to 2700K with total flux output of 1000 lm. In response to receipt of the command, a set of data that contains information of the required flux output of each group of LEDs is then preferably retrieved from the internal look-up table 50a of device 50. Based on the 100% duty cycle (full power) flux output of each group of LEDs, device 50 will generate pulse width modulation (PWM) signals to control current sources 53, 55 and 57 to alter the flux output of each group of LEDs in order to achieve the desired CCT and total flux output.

Also, preferably temperature sensors are included in current sources 53, 55 and 57 to sense the temperature of groups of LEDs 52, 54 and 56, respectively. The currents supplied by the current sources are preferably adjusted by the temperature sensors to compensate the flux variation due to temperature changes, allowing the 100% duty cycle flux output of each group of LEDs to be maintained irrespective of temperature changes. Voltage sources V1, V2 and V3 must be chosen with voltage higher than the forward voltage of their respective group of LEDs. Practically, a single voltage source with voltage higher than the forward voltages of all groups of LEDs can be used instead of 3 individual voltage sources.

Figure 9:
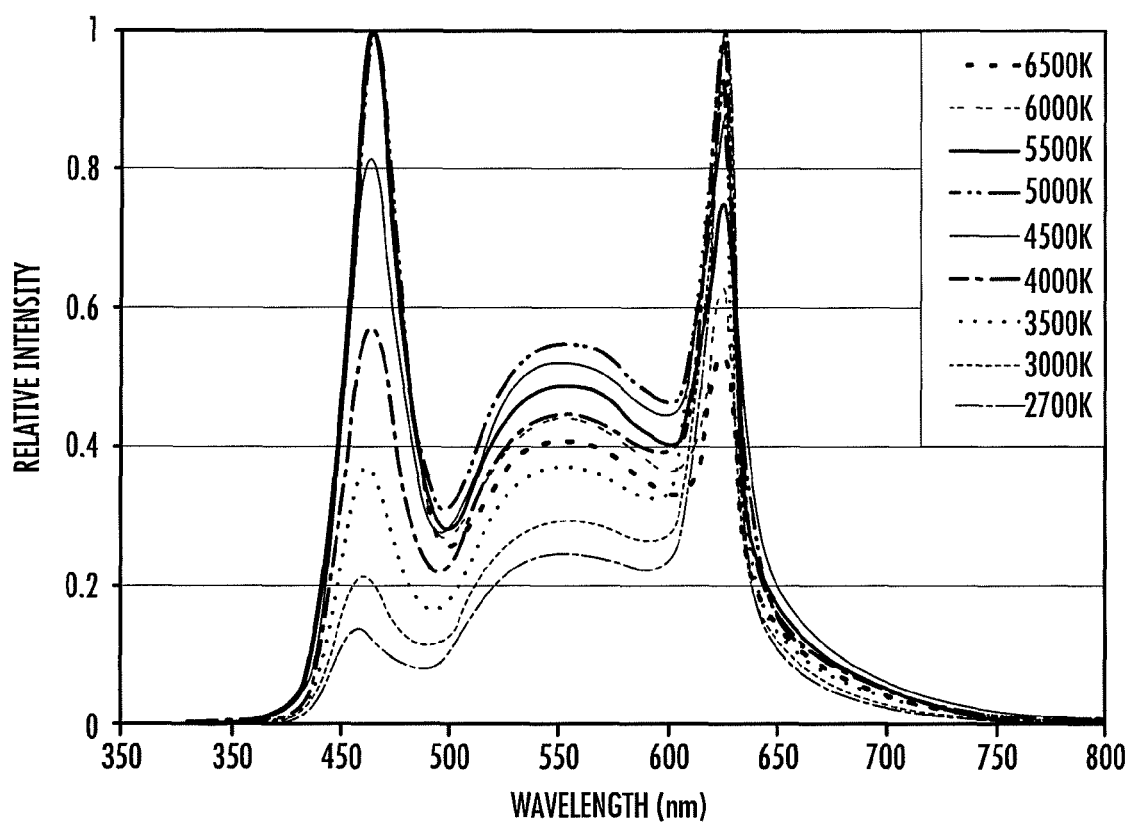
FIG. 9 shows the relative spectrum of the results with 2700K, 3000K, 3500K, 4000K, 4500K, 5000K, 5500K, 6000K and 6500K in accordance with an aspect of the present invention.

FIG. 9 is a diagram that shows the relative spectrum of the results, showing relative intensity vs. wavelength, with CCT values of 2700K, 3000K, 3500K, 4000K, 4500K, 5000K, 5500K, 6000K and 6500K in accordance with an aspect of the present invention.

Figure 10:
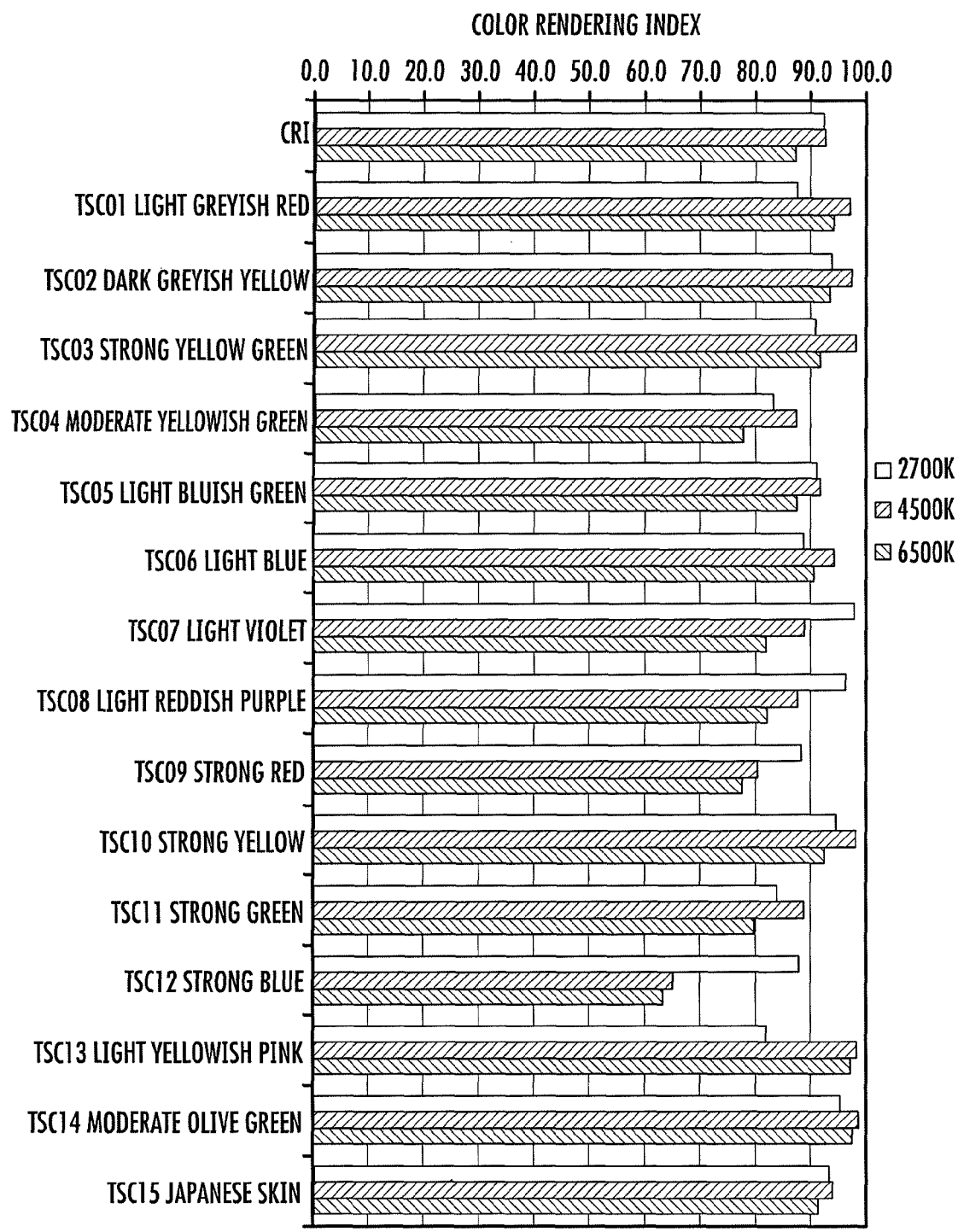
FIG. 10 shows the general CRI for 2700K, 4500K and 6500K, which is an average value of the first eight testing color samples (TSC01 to TSC08) and individual Ri values for all 15 CIE test color samples.

FIG. 10 shows experimental results, using a lighting device in accordance with the present invention, for the general CRI Ra for CCTs of 2700K, 4500K and 6500K, which is an average value of eight testing color samples (TSC01 to TSC08), and individual Ri values for 15 CIE test color samples. FIG. 10 also shows that, in an aspect of the present invention, high Ri values can be obtained in connection with skin color samples TSC13 and TSC15, which correspond to Caucasian and Asian skin tones, respectively.

The LEDs used in the lighting devices in accordance with the preferred embodiments are not limited to single colored LEDs. Multiple-colored LEDs may also be used. For example, if Red/Blue/Green LEDs (RGB LEDs) are used to create a pixel, combined with a variable luminance control, the colors at each pixel can combine to form a range of colors. Further, one or more LED chips can be included in a package with one or more lumiphors (e.g., blue LED with phosphor, as in the embodiment described above).

The device and method according to the embodiments described above have several advantages compared with conventional lighting methods and devices, and, when controlled by an electrical control, is suitable for use in most indoor and outdoor lighting systems when different CCT light is desired while at the same time providing high color rendering performance.

For example, in accordance with an aspect of the present invention, a wide CCT adjustable range (2700K to 6500K) is achieved with high efficiency in source lumen usage. 2700K to 6500K is the typical CCT range for artificial lighting in most applications. Only an additional less than 15% source flux is needed to achieve such a wide CCT adjusting range, and the additional source is at an off or dimming-status, consuming no extra electrical power.

For example, Halogen or tungsten sources are usually a warm white source, and the typical CCT will be less than 3500K. To get a high CCT with the such a light source, filters would have to be used, and causing at least 20 to 50% light loss, which is highly inefficient compared with the present invention.

Gas discharge lamps, such as fluorescent tubes, are usually neutral white or cool white colored (with a CCT>4000K). To achieve CCT of 2700K, at least 20% light would have to be blocked to achieve that CCT change.

While conventional multi-colored LEDs could also achieve this CCT adjustable range, for example RGB (Red, Green and blue) displays, RGBA (red, green, blue and amber) displays, or white plus red and cyan displays, only 50 to 60% of the source light will be used for any selected CCT, resulting in an increase in cost of 40%. In contrast, in accordance with the aspects of the invention of the present application, no more than 15% additional cost will be added.

Moreover, the aspects of the present invention provide for a high color rendering index. For the CCT range from 2700K~6500K, which is typical range for general lighting application, the invention described in the present application achieves a CRI>85. When the CCT range is narrowed down, such as between 2700K~5500K, the CRI could be more than 90.

Further, while Halogen or tungsten lamps have high CRI, only warm white light is available. Gas discharge lamps, like fluorescent tube or HID, can have different CCT options, but CRI is typically less than 85 typically.

The present invention is also skintone favorable and achieves high index values for CRI color samples No. 13 and 15 in FIG. 10, which represent typical skin color for Caucasian and Asian skin tones, respectively.

The aspects of the present invention described above also achieve a true white color, with a mixed white color that can be less than 3 MacAdam ellipses from the reference point on the Planckian locus.

For other kinds of light sources, such as halogen or HID lamps, different CCT adjustment within a same lamp usually use color filters to block the unwanted color for the target CCT. Therefore 20~50% of light will be wasted and the electrical power as well.

Further, in comparison with other LED solutions, the above aspects of the invention achieve the target—a wide CCT tunable range (2700K~6500K), high CRI, true white—and at the same time use as few kinds of sources as possible, only three groups of light sources. Other solutions would need at least 4 channels or more to achieve the three above-mentioned objectives simultaneously. Also, high efficiency in source flux usage is achieved, in which over 85% lumen can be used, in comparison with 50~60% with the other solutions discussed above, saving additional cost.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of achieving a tunable white light in a solid state light emitting lighting apparatus, said method comprising:
   illuminating a first group of one or more solid state light emitters which emit light having a dominant wavelength in the range of from 430 nm to 485 nm;
   exciting a first group of one or more lumiphors which emit light having a dominant wavelength in the range of from 555 nm to 585 nm;
   illuminating a second group of one or more solid state light emitters which emit light having a dominant wavelength in the range of from 430 nm to 485 nm; and
   illuminating a third group of one or more solid state light emitters which emit light having a dominant wavelength in the range of from 600 nm to 635 nm such that:
   a combination of light exiting said solid state emitting lighting apparatus which was emitted by (1) said first group of solid state light emitters, (2) said first group of lumiphors, (3) said second group of solid state light emitters, and (4) said third group of solid state light emitters produces a mixture of light having x, y coordinates on a 1931 CIE Chromaticity Diagram which defines a point which is within three (3) or less MacAdam ellipses of at least one point on the Planckian locus on a 1931 CIE Chromaticity Diagram.

2. A method of achieving a tunable white light in a solid state light emitting lighting apparatus, said method comprising:
   illuminating a first group of solid state light emitters, said first group includes at least one solid state light emitter, such that each solid state light emitter in said first group emits light having a dominant wavelength in the range of from 430 nm to 485 nm;
   exciting a first group of one or more lumiphors which emit light having a dominant wavelength in the range of from 555 nm to 585 nm;
   illuminating a second group of solid state light emitters, said second group includes at least one solid state light emitter, such that each solid state light emitter in said second group emits light having a dominant wavelength in the range of from 430 nm to 485 nm; and
   illuminating a third group of solid state light emitters, said third group includes at least one solid state light emitter, such that each solid state light emitter in said third group emits light having a dominant wavelength in the range of from 600 nm to 635 nm such that:
   a combination of light exiting said solid state emitting lighting apparatus which was emitted by (1) said first group of solid state light emitters, (2) said first group of lumiphors, (3) said second group of solid state light emitters, and (4) said third group of solid state light emitters produces a mixture of light having x, y coordinates on a 1931 CIE Chromaticity Diagram which defines a point which is within three (3) or less MacAdam ellipses of at least one point on the Planckian locus on a 1931 CIE Chromaticity Diagram.

3. The method according to claim 1 or 2, wherein if all of said first group of solid state light emitters are illuminated, at least one of the lumiphors in the first group of lumiphors is excited by light emitted by the first group of solid state light emitters.

4. The method according to claim 1 or 2, wherein resultant white light produced by the combination of the light emitters of the first group of solid state light emitters and the respective first group of lumiphors is above the Planckian locus in the 1931 CIE chromaticity Diagram, and more than 7 MacAdam ellipses away from any point on the Planckian locus, and has a CCT between 3200K and 6000K, with a duv of >0.006.

5. The method according to claim 1 or 2, wherein if all of said first group of solid state light emitters are illuminated, all of the lumiphors in the first group of lumiphors is excited by light emitted by the first group of solid state light emitters.

6. The method according to claim 1 or 2, wherein said tunable white light from said solid state light emitting lighting apparatus has a CCT range of from 2700 k to 4500 k, from 2700 k to 6500 k, or between 2700 k to 6500 k.

7. The method according to claim 1 or 2, wherein said tunable white light from said solid state light emitting lighting apparatus has a CRI of more than 85.

8. The method according to claim 1 or 2, wherein said tunable white light from said solid state light emitting lighting apparatus has a CRI of more than 90.

9. The method according to claim 1 or 2, wherein said tunable white light from said solid state light emitting lighting apparatus has a CCT range of from 2700K to 6500K and a CRI of more than 85.

10. The method according to claim 1 or 2, wherein said tunable white light from said solid state light emitting lighting apparatus has a CCT range of from 2700K to 5500K and a CRI of more than 90.

11. The method according to claim 1 or 2, wherein a combination of (1) light exiting said solid state light emitting lighting apparatus which was emitted by said first group of solid state light emitters, and (2) light exiting said solid state light emitting lighting apparatus which was emitted by said first group of lumiphors would, in the absence of additional light, produce a sub-mixture of white light which is above the Planckian locus in a 1931 CIE Chromaticity Diagram and more than seven (7) MacAdam ellipses from any point on the Planckian locus.

12. The method according to claim 1 or 2, wherein in the step of illuminating said third group of solid state light emitters, each solid state light emitter in said third group emits light that has a dominant wavelength in the range of from 615 nm to 620 nm.

13. The method according to claim 1 or 2, wherein in the step of illuminating said second group of solid state light emitters, each solid state light emitter in said second group emits light that has a dominant wavelength in the range of from 460 nm to 475 nm.

14. The method according to claim 1 or 2, wherein the relative flux ratios of the first, second and third groups are controlled by a current controller such that the first group of LEDs accounts for no less than 75% of the total lumen output, the second group accounts for no more than 10% of the total lumen output, and the third group accounts for no more than 25% of the total lumen output.

15. The method according to claim 1 or 2, further comprising adjusting the CCT of the solid state light emitting lighting apparatus by varying the driving currents of the LEDs, while maintaining a constant lumen output for any given CCT.

16. The method according to claim 1 or 2, further comprising adjusting the CCT of the solid state light emitting lighting apparatus by varying the total lumen output of the apparatus for different CCT options.

17. A lighting apparatus comprising:
a first group of one or more solid state light emitters which emit light having a dominant wavelength in the range of from 430 nm to 485 nm;
a first group of one or more lumiphors which emit light having a dominant wavelength in the range of from 555 nm to 585 nm;
a second group of one or more solid state light emitters which emit light having a dominant wavelength in the range of from 430 nm to 485 nm; and
a third group of one or more solid state light emitters which emit light having a dominant wavelength in the range of from 600 nm to 635 nm; and
at least first, second and third power lines, said first group of solid state light emitters, said second group of solid state light emitters, and said third group of solid state light emitters each being electrically coupled to at least one of said first, second and third power lines,
wherein when current is supplied to at least one of said first, second and third power lines, a combination of light exiting said lighting apparatus which was emitted by (1) said first group of solid state light emitters, (2) said first group of lumiphors, (3) said second group of solid state light emitters, and (4) said third group of solid state light emitters produces a mixture of light having x,y coordinates on a 1931 CIE Chromaticity Diagram which defines a point which is within three (3) or less MacAdam ellipses of at least one point on the Planckian locus on a 1931 CIE Chromaticity Diagram.

18. The lighting apparatus according to claim 17, wherein if current is supplied to a power line, a combination of (1) light exiting the lighting apparatus which was emitted by the first group of solid state light emitters, (2) light exiting the lighting apparatus which was emitted by the first group of lumiphors, (3) light exiting the lighting apparatus which was emitted by the second group of solid state light emitters, and (4) light exiting the lighting apparatus which was emitted by the third group of solid state light emitters would, in an absence of any additional light, produce light having x, y color coordinates within an area on a 1931 CIE Chromaticity Diagram defined by points having coordinates (x=0.3863, y=0.4713); (x=0.1319, y=0.0747); (x=0.6867, y=0.3132).

19. The lighting apparatus according to claim 17, wherein said first group of solid state light emitters comprise a plurality of LEDs, said second group of solid state light emitters comprise a plurality of LEDs, and said third group of solid state light emitters comprise a plurality of LEDs.

20. The lighting apparatus according to claim 17, wherein said lighting apparatus is tunable as to CCT level by adjusting the current levels applied to one or more of the first, second and third groups of solid state light emitters.

21. The lighting apparatus according to claim 17, wherein said lighting apparatus is tunable to achieve a Ra>90, at CCT=2700K, 4500K and 6500K, and R13 and R15>90 on color samples corresponding to the color of human skin.

22. The lighting apparatus according to claim 17, further comprising first, second and third current sources, corresponding to said first, second and third groups of solid state light emitters, respectively, and a controller that controls the current applied to said first, second and third groups of solid state light emitters, said controller being adapted to control the first, second and third current sources such that said lighting apparatus can achieve a Ra>90, at CCT=2700K, 4500K and 6500K, and R13 and R15>90 on color samples corresponding to the color of human skin.

23. The lighting apparatus according to claim 17, wherein if all of said first group of solid state light emitters are illuminated, at least one of the lumiphors in the first group of lumiphors is excited by light emitted by the first group of solid state light emitters.

24. The lighting apparatus according to claim 17, wherein resultant white light produced by the combination of the light emitters of the first group of solid state light emitters and the respective first group of lumiphors is above the Planckian locus in the 1931 CIE chromaticity Diagram, and more than 7 MacAdam ellipses away from any point on the Planckian locus, and has a CCT between 3200K and 6000K, with a duv of >0.006.

25. The apparatus according to claim 17, wherein if all of said first group of solid state light emitters are illuminated, all of the lumiphors in the first group of lumiphors is excited by light emitted by the first group of solid state light emitters.

26. The apparatus according to claim 17, wherein said tunable white light from said solid state light emitting lighting apparatus has a CCT range of from 2700 k to 4500 k, from 2700 k to 6500 k, or between 2700 k to 6500 k.

27. The apparatus according to claim 17, wherein said tunable white light from said solid state light emitting lighting apparatus has a CRI of more than 85.

28. The apparatus according to claim 17, wherein said tunable white light from said solid state light emitting lighting apparatus has a CRI of more than 90.

29. The apparatus according to claim 17, wherein said tunable white light from said solid state light emitting lighting apparatus has a CCT range of from 2700K to 6500K and a CRI of more than 85.

30. The apparatus according to claim 17, wherein said tunable white light from said solid state light emitting lighting apparatus has a CCT range of from 2700K to 5500K and a CRI of more than 90.

31. The apparatus according to claim 17, wherein a combination of (1) light exiting said solid state light emitting lighting apparatus which was emitted by said first group of solid state light emitters, and (2) light exiting said solid state light emitting lighting apparatus which was emitted by said first group of lumiphors would, in the absence of additional light, produce a sub-mixture of white light which is above the Planckian locus in a 1931 CIE Chromaticity Diagram and more than seven (7) MacAdam ellipses from any point on the Planckian locus.

32. The apparatus according to claim 17, wherein, when illuminated, each solid state light emitter in said third group emits light that has a dominant wavelength in the range of from 615 nm to 620 nm.

33. The apparatus according to claim 17, wherein, when illuminated, each solid state light emitter in said second group emits light that has a dominant wavelength in the range of from 460 nm to 475 nm.

34. The apparatus according to claim 17, further comprising a current controller that controls the relative flux ratios of the first, second and third groups such that the first group of LEDs accounts for no less than 75% of the total lumen output, the second group accounts for no more than 10% of the total lumen output, and the third group accounts for no more than 25% of the total lumen output.

35. The apparatus according to claim 17, further comprising a current controller that adjusts the CCT of the solid state light emitting lighting apparatus by varying the driving currents of the LEDs, while maintaining a constant lumen output for any given CCT.

36. The apparatus according to claim 17, further comprising a current controller that adjusts the CCT of the solid state light emitting lighting apparatus by adjusting the total lumen output of the apparatus for different CCT options.

37. The lighting apparatus according to claim 17, wherein said lighting apparatus is tunable to achieve a Ra>90, at CCT in a range of 2700K~6500K, and R13 and R15>90 on color samples corresponding to the color of human skin.

38. The lighting apparatus according to claim 17, further comprising first, second and third current sources, corresponding to said first, second and third groups of solid state light emitters, respectively, and a controller that controls the current applied to said first, second and third groups of solid state light emitters, said controller being adapted to control the first, second and third current sources such that said lighting apparatus can achieve a Ra>90, at CCT in a range of 2700K~6500K, and R13 and R15>90 on color samples corresponding to the color of human skin.

39. The apparatus according to claim 17, further comprising a current controller that controls the relative flux ratios of the first, second and third groups, the controller having a look-up table associated therewith, the controller being programmed to:
accept commands from a user, including a command to set a CCT and a total flux output in response to receipt of the command,
retrieve a set of data that contains information of the required flux output of each group of LEDs from the look-up table, and
based on the 100% duty cycle (full power) flux output of each group, generate pulse width modulation (PWM) signals to control current supplied to each group to alter the flux output of each group in order to achieve a desired CCT and total flux output.

40. The apparatus according to claim 39, further comprising first, second and third current sources, corresponding to said first, second and third groups, respectively, the controller controlling the current supplied to each group via said first, second and third current sources.

41. The apparatus according to claim 40, said first, second and third current sources each having a temperature sensor to sense the temperature of groups, respectively, wherein currents supplied by the current sources are adjusted by the temperature sensors to compensate the flux variation due to temperature changes, allowing the 100% duty cycle flux output of each group of LEDs to be maintained irrespective of temperature changes.

42. A lighting apparatus comprising:
a first group of solid state light emitters;
a first group of lumiphors;
a second group of solid state light emitters;
a third group of solid state light emitters; and
at least first, second and third power lines, said first group of solid state light emitters, said second group of solid state light emitters, and said third group of solid state light emitters each being electrically coupled to at least one of said first, second and third power lines,
wherein said first group of solid state light emitters includes at least one solid state light emitter, such that each solid state light emitter in said first group, if illuminated, emits light having a dominant wavelength in the range of from 430 nm to 485 nm; said first group of lumiphors includes at least one lumiphor, such that each lumiphor in said first group, when excited, emits light having a dominant wavelength in the range of from 555 nm to 585 nm; said second group of solid state light emitters includes at least one solid state light emitter, such that each solid state light emitter in said second group, if illuminated, emits light having a dominant wavelength in the range of from 430 nm to 485 nm; and said third group of solid state light emitters includes at least one solid state light emitter, such that each solid state light emitter in said third group, if illuminated, emits light having a dominant wavelength in the range of from 600 nm to 635 nm; if current is supplied to at least one of said first, second and third power lines, a combination of light exiting said solid state emitting lighting apparatus which was emitted by (1) said first group of solid state light emitters, (2) said first group of lumiphors, (3) said second group of solid state light emitters, and (4) said third group of solid state light emitters produces a mixture of light having x,y coordinates on a 1931 CIE Chromaticity Diagram which defines a point which is within three (3) or less MacAdam ellipses of at least one point on the Planckian locus on a 1931 CIE Chromaticity Diagram.

43. A lighting apparatus comprising:
a first group of solid state light emitters;
a first group of lumiphors;
a second group of solid state light emitters;
a third group of solid state light emitters;
at least first, second and third power lines, said first group of solid state light emitters, said second group of solid state light emitters, and said third group of solid state light emitters each being electrically coupled to at least one of said first, second and third power lines; and
a current controller that controls the relative flux ratios of the first, second and third groups, the controller having a look-up table associated therewith, the controller being programmed to:
accept commands from a user, including a command to set a CCT and a total flux output in response to receipt of the command,
retrieve a set of data that contains information of the required flux output of each group of LEDs from the look-up table, and
based on the 100% duty cycle (full power) flux output of each group, generate pulse width modulation (PWM) signals to control current supplied to each group to alter the flux output of each group in order to achieve a desired CCT and total flux output.

44. The lighting apparatus according to claim 43, further comprising first, second and third current sources, corresponding to said first, second and third groups, respectively, the controller controlling the current supplied to each group via said first, second and third current sources.

45. A method on a solid state lighting apparatus comprising: a first group of solid state light emitters; a first group of lumiphors; a second group of solid state light emitters; a third group of solid state light emitters; at least first, second and third power lines, said first group of solid state light emitters, said second group of solid state light emitters, and said third group of solid state light emitters each being electrically coupled to at least one of said first, second and third power lines; and a current controller that controls the relative flux ratios of the first, second and third groups, the controller having a look-up table associated therewith, the method comprising the controller:

accepting commands from a user, including a command to set a CCT and a total flux output in response to receipt of the command, retrieving a set of data that contains information of the required flux output of each group of LEDs from the look-up table, and based on the 100% duty cycle (full power) flux output of each group, generating pulse width modulation (PWM) signals to control current supplied to each group to alter the flux output of each group in order to achieve a desired CCT and total flux output.

46. A lighting apparatus comprising:

first, second and third groups of solid state light emitters;

a first group of lumiphors;

at least first, second and third power lines, the first, second and third group of solid state light emitters each being electrically coupled to at least one of the first, second and third power lines;

a current controller that controls the relative flux ratios of the first, second and third groups, the controller being programmed to, in response to receipt of a command, retrieve a set of data from a look-up table that contains information of the required flux output of each group of LEDs and generate pulse width modulation (PWM) signals to control current supplied to each group to alter the flux output of each group in order to achieve a desired CCT and total flux output.

* * * * *